(12) United States Patent
Kurzmann et al.

(10) Patent No.: US 7,257,100 B2
(45) Date of Patent: Aug. 14, 2007

(54) METHOD FOR CARRYING OUT A TRANSFER PROCEDURE IN A RADIO COMMUNICATION SYSTEM FOR A PACKET-SWITCHING CONNECTION AND RADIO COMMUNICATION SYSTEM SUITABLE FOR THE SAME

(75) Inventors: Bernd Kurzmann, Vienna (AT); Mathias Pieroth, Gilching (DE)

(73) Assignee: Siemens Aktiengesellschaft, Munich (DE)

( * ) Notice: Subject to any disclaimer, the term of this patent is extended or adjusted under 35 U.S.C. 154(b) by 110 days.

(21) Appl. No.: 10/528,193

(22) PCT Filed: Sep. 4, 2003

(86) PCT No.: PCT/DE03/02943

§ 371 (c)(1),
(2), (4) Date: Oct. 14, 2005

(87) PCT Pub. No.: WO2004/028189

PCT Pub. Date: Apr. 1, 2004

(65) Prior Publication Data

US 2006/0098597 A1 May 11, 2006

(30) Foreign Application Priority Data

Sep. 17, 2002 (DE) ................................ 102 43 142

(51) Int. Cl.
*H04Q 7/00* (2006.01)
(52) U.S. Cl. ...................... 370/331; 370/390; 370/394; 370/465; 455/436; 455/439

(58) Field of Classification Search ................ 370/331, 370/325, 465, 328, 342, 435.1, 435.3, 338, 370/466, 332–333, 355, 359, 400–407, 395–397, 370/390; 455/436, 432.1, 432.3, 435.1, 437–440, 455/442, 443–445, 422.1, 466, 454, 524–525
See application file for complete search history.

(56) References Cited

U.S. PATENT DOCUMENTS 5,471,644 A 11/1995 Schatz et al.

(Continued)

FOREIGN PATENT DOCUMENTS

WO WO00/79808 A2 12/2000

OTHER PUBLICATIONS

Balke, "Mobilfunknetze und ihre Protokolle", Band 1, Teubner-Verlag Stuttgart; 1998; pp. 139-151.

(Continued)

*Primary Examiner*—Pablo N. Tran
(74) *Attorney, Agent, or Firm*—Staas & Halsey LLP

(57) ABSTRACT

A packet-switching connection is set up from a mobile station through a first transceiver unit, whereby the mobile station is assigned to a first cell and a first residence zone. As the mobile station moves to a second cell and a second residence zone, the connection is assigned a residence zone change identification. A transfer procedure for the packet-oriented connection from the first cell to the second cell is carried out. After the transfer procedure a data exchange by the packet-switched connection is reestablished. After reestablishing the data exchange a procedure for residence zone exchange is carried out.

20 Claims, 1 Drawing Sheet

U.S. PATENT DOCUMENTS

| | | | |
|---|---|---|---|
| 5,930,714 A * | 7/1999 | Abu-Amara et al. | 455/442 |
| 6,064,885 A * | 5/2000 | Rouhollahzadeh et al. | 455/439 |
| 6,574,475 B1 * | 6/2003 | Suzuki | 455/438 |
| 6,940,834 B2 * | 9/2005 | Bakke et al. | 370/331 |
| 6,983,148 B1 * | 1/2006 | Kirla | 455/436 |
| 2005/0272428 A1 * | 12/2005 | Tanabe et al. | 455/439 |
| 2006/0148475 A1 * | 7/2006 | Spear et al. | 455/436 |
| 2006/0148485 A1 * | 7/2006 | Kangas et al. | 455/453 |
| 2006/0239229 A1 * | 10/2006 | Marinescu et al. | 370/331 |
| 2007/0010252 A1 * | 1/2007 | Balachandran et al. | 455/437 |
| 2007/0021120 A1 * | 1/2007 | Flore et al. | 455/436 |
| 2007/0036109 A1 * | 2/2007 | Kwak et al. | 370/331 |
| 2007/0041346 A1 * | 2/2007 | Bae et al. | 370/331 |

OTHER PUBLICATIONS

Balke, "Mobilfunknetze und ihre Protokolle", Band 1, Teubner-Verlag Stuttgart; 1998; pp. 295-311.

* cited by examiner

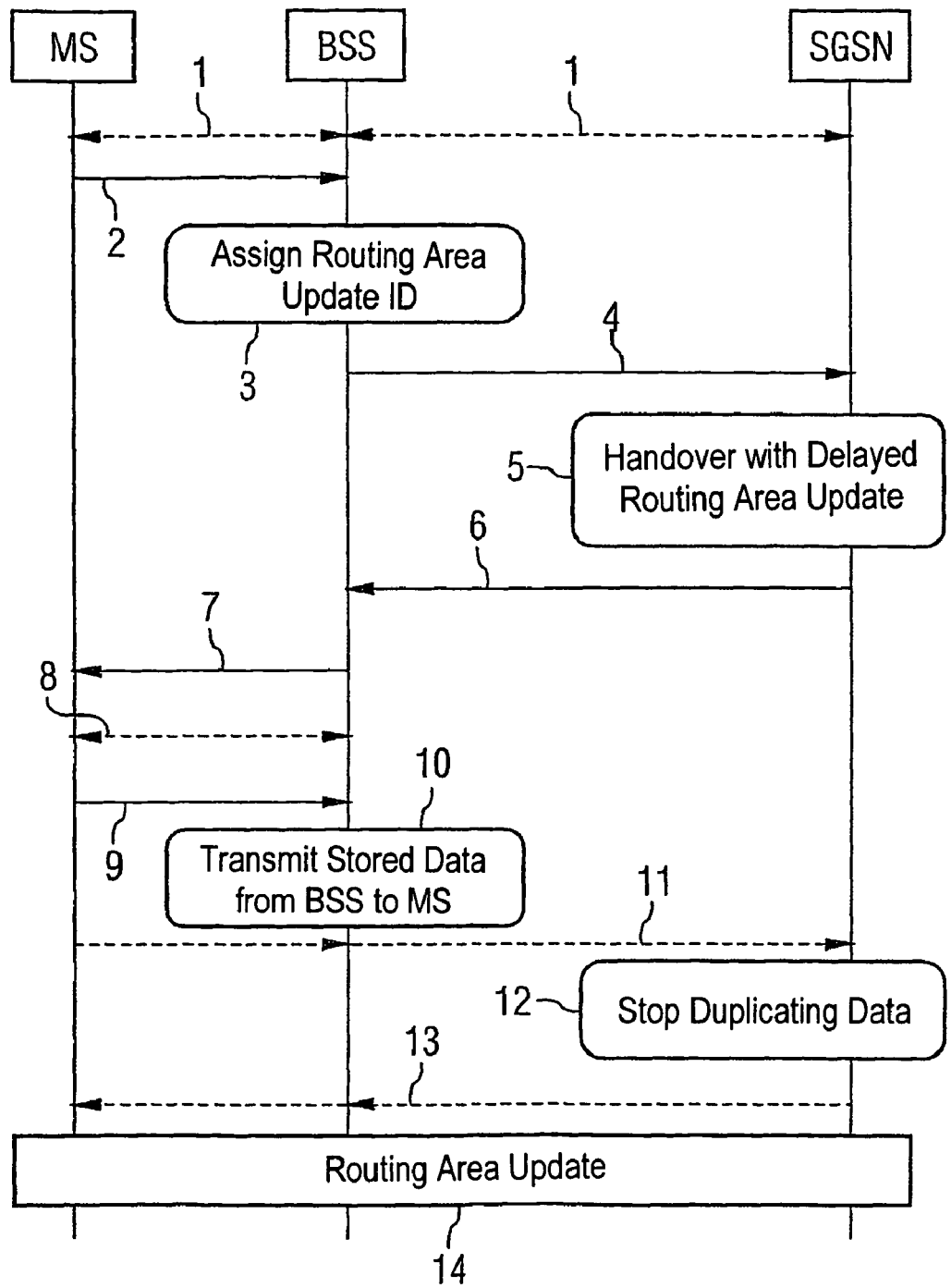

METHOD FOR CARRYING OUT A TRANSFER PROCEDURE IN A RADIO COMMUNICATION SYSTEM FOR A PACKET-SWITCHING CONNECTION AND RADIO COMMUNICATION SYSTEM SUITABLE FOR THE SAME

CROSS REFERENCE TO RELATED APPLICATIONS

This application is based on and hereby claims priority to PCT Application No. PCT/DE2003/002943 filed on Sep. 4, 2003 and German Application No. 102 43 142.6 filed on Sep. 17, 2002, the contents of which are hereby incorporated by reference.

BACKGROUND OF THE INVENTION

Radio communication systems are used for the transmission of information, speech or data, with the aid of electromagnetic waves over a radio interface between a sending and a receiving radio station. An example of a radio communication system is the known GSM mobile radio network, as well as its further development GPRS, for which the network architecture is described for example in B. Walke, "Mobilfunknetze und ihre Protokolls" (Mobile Radio Networks and their Protocols), Volume 1, Teubner-Verlag Stuttgart, 1998, Pages 139 to 151 and Pages 295 to 311. In this case a channel formed from a narrowband frequency range and a time slot is provided in each case for transmission of a subscriber signal.

For packet switched data transmission, the data is transmitted for a plurality of subscribers in the time division multiplex over one and the same channel. Each subscriber can thus occupy a plurality of channels simultaneously in this case.

For packet switching, a radio communication system, for example a GSM mobile radio network with GPRS, comprises a plurality of packet data service nodes (Serving GPRS Support Node, SGSN) which are internetworked and establish access to a fixed network. The Serving GPRS Support Nodes are further connected to Base Station Controllers (BSC). Each Base Station Controller in its turn makes possible at least one connection to at least one Base Station (BTS) and handles the administration of the technical resources of the base stations connected to it. Such a base station is a transceiver unit which can establish a telecommunication connection to mobile stations over a radio interface.

The individual subscribers are assigned to a channel via a packet data control unit which is provided in the base station controller in each case.

An area covered by a radio communication system is divided up into individual radio zones which are also referred to as cells. A cell here is served by one of the base stations via which radio connections are set up from mobile stations located in this cell. Further the area which is covered by a radio communication system is subdivided into residence zones, also known as routing areas. A routing area in this case comprises a plurality of radio cells. The area which is controlled by a Serving GPRS Support Node (SGSN) can be assigned a plurality of routing areas. The routing areas are administered by an administration system which is frequently also referred to as Mobility Management and is housed on the packet service node.

If a mobile station moves from the area of a cell into another cell, if the radio connection is still in place, an automatic procedure known as a handover is undertaken. This means that an active radio connection is retained even across cell borders. In the handover procedure the radio connection which is established over a first transceiver unit is switched over to a second transceiver unit.

If a mobile station moves out of the territory of one routing area into another routing area a process known as a routing area update must be undertaken. The mobile station is assigned an identifier in the relevant routing area, known in the GPRS system by the name of Temporary Logical Link Identifier (TLLI). In this case the mobile station must be assigned a new TLLI in the new routing area.

In the GPRS system, Release 5 (see 3GPP TS23.060, Pages 32 to 110) there is provision for the mobile station to establish the necessity for a handover procedure for packet switched data. If a handover procedure is to be performed for a mobile station, the mobile station registers with the base station of the new cell. If a change of routing area is taking place at the same time, a procedure for routing area update must first be performed, in which the mobile station will be assigned a new identifier. Only after the procedure for routing area update has successfully concluded can the exchange of data between the new transceiver unit and the mobile station continue. During the routing area update procedure the exchange of data is interrupted. This interruption is perceived as disruptive for various applications such as streaming applications or conversational services for example.

SUMMARY OF THE INVENTION

There is a need for a method and a suitably adapted radio communication system for executing a handover procedure for a packet switched connection in which the length of time during which the exchange of data is interrupted is reduced.

A packet switched connection is set up between a mobile station and a first transceiver unit. In this case the mobile station is assigned to a first cell, which is served by a first transceiver unit, and a first routing area. If the mobile station now moves into a second cell which is served by a second transceiver unit, and into a second routing area, the connection is assigned a routing area update identifier. Subsequently a handover procedure of the packet switched connection from the first cell into the second cell is performed. After the handover procedure an exchange of data is resumed again over the packet switched connection. After the exchange of data is resumed a procedure for routing area update is performed.

Since the procedure for routing area update is not performed until after the exchange of data has been resumed after the handover procedure, the procedure for routing data update runs in parallel with that for data exchange. This means that the length of an interruption to the data exchange during the handover procedure is greatly reduced. Since the connection is allocated a routing area update identifier which is available in the radio communication system, it is also possible before the procedure for routing area update is performed, to send data to the mobile station which is now in the second cell and the second routing area.

Preferably, before the handover procedure from the first cell into the second cell is executed, radio resources for the packet switched connection are reserved in the second cell. This enables the switchover of the packet switched connection from the first cell to the second cell to be undertaken very quickly, so that in practice an interruption to the exchange of data will be avoided Preferably data packets for the mobile station which arrive at the first transceiver unit are duplicated as soon as the routing area update identifier is allocated to the connection, that is as soon as it is clear that there is provision for a switchover from the first cell into the second cell and the first routing area into the second routing area. The duplicated data packets are made available in the second transceiver unit, so that the identical data packets are present in both the first transceiver unit and also in the second transceiver unit. The data packets can be duplicated in the first transceiver unit. In this case the duplicated data packets must be transferred via an assigned Serving GPRS Support Node SGSN to the second transceiver unit. Alternatively the data packets can be duplicated in the assigned Serving GPRS Support Node SGSN, from which the data packets are transmitted to the first transceiver unit and to the second transceiver unit. The duplication of the data packets during the time for the handover procedure from the first cell into the second cell ensures that data packets arriving during this period reach the mobile station regardless of via which of the transceiver units the connection is currently switched.

It is possible, that, after the handover procedure, at least for a transitional period, the same data compression and the same data encryption are used as before the handover procedure. The advantage of this is that the handover procedure runs below the layers responsible for data compression and data encryption. These layers, usually LLC (Logical Link Control) and SNDCP (Sub-Network Dependant Convergence Protocol), and the associated protocols can thus continue to be used unchanged. In addition the signaling overhead for a reconfiguration of encryption and compression is avoided.

It is also possible for the mobile station in the first routing area to be assigned a first identifier and in the second routing area a second identifier. The first identifier and the second identifier can be embodied as Temporary Logical Link Identifiers TLLI. For the switchover of the mobile station into the second cell, the mobile station will be assigned a temporary identifier which is used until the procedure for routing area update has been performed. This temporary identifier enables the mobile station to be reached in the second cell, although the procedure for routing area update has not yet been performed. The temporary identifier can be assigned to the mobile station by an administrator, for example the network operator. Alternatively the temporary identifier can be assigned by the associated Serving GPRS Support Node SGSN.

The temporary identifier can be selected from a set of reserved identifiers available for this purpose. These can typically be specific TLLI identifiers, which can for example be designated as handover TLLIs. These identifiers are for example specified by the administrator.

Alternatively the temporary identifier will be made up of a first identifier and of a supplementary identifier, for example a flag. The supplementary identifier is simply appended to the first identifier or prefixes it. The routing area update identifier can for example be used as a supplementary identifier.

Since in the radio communication network it is known from the assigned routing area update identifier that the mobile station with a foreign identifier is located in the second routing area, it is guaranteed that data intended for the mobile station reach the mobile station. A foreign identifier here is taken to mean an identifier which is not assigned to the second routing area, or alternatively an identifier which is assigned to the second routing area but for which an entry has not yet been made in the Mobility Management, as would be the case for a correctly registered subscriber, since the procedure for routing area update has not yet been performed.

At the end of the handover procedure a data packet may be transmitted from the mobile station to the second transceiver unit. Based on the receipt of this data packet the second transceiver unit recognizes that the handover procedure can be completed and starts sending to the mobile station. The data packet which is sent from the mobile station to the second transceiver unit can, if there is no data present to be sent from the mobile station to the transceiver unit, be generated separately for this purpose.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The Figure shows a schematic of the exchange of messages for a cell and routing area update between a mobile station, a base station system and a Serving GPRS Support Node SGSN.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In a first cell, which is served by a first transceiver unit, a packet switched connection 1 is established from a mobile station MS via a base station system BSS to a Serving GPRS Support Node SGSN. In this case data is transmitted both in the uplink direction from the mobile station MS to the base station system BSS and also in the downlink direction, from the base station system BSS to the mobile station MS. In addition measurement reports 2, from which the quality of the connection between the mobile station MS and the base station system BSS can be derived, are sent between the mobile station MS and the base station system BSS. On the basis of the measurement reports 2 the necessity for a change from the first cell into a second cell and from a first routing area into a second routing area is recognized in the base station system BSS.

After this a preparation 3 for a handover procedure is started in the base station system BSS. Radio resources are reserved in the second cell for this purpose. This includes the reservation of the transmission capacity on the uplink and downlink channels in the second cell. Furthermore virtual data connections, so-called Network Service Virtual Connections, are reserved for the uplink direction in the second cell. Furthermore the packet switched connection is assigned a routing area update identifier, for example Routing Area Change.

Subsequently a request 4 for a handover procedure is directed to the Serving GPRS Support Node SGSN. The request 4 contains as one of its parameters the routing area update identifier Routing Area Change, identifying the second cell, into which the handover procedure is to lead, as well as information about the properties of the packet data which will be transmitted over the packet switched connection. This type of information is for example so-called Packet Flow Contexts, from which priority and quality of service of the packet data involved are obtained.

In the Serving GPRS Support Node SGSN the packet switched connection is then put into a special mode 5, which for example is called Handover with delayed Routing Area Update. Simultaneously virtual data connections, for example Network Service Virtual Connections, are reserved in the second cell for the downlink direction. It is also ensured that incoming data packets are duplicated and are forwarded to the first base station and the second base station.

Subsequently the Serving GPRS Support Node SGSN transmits to the base station system BSS an instruction 6 for a handover procedure. The routing area update identifier in the form of the specific state handover procedure with delayed routing area update is sent as an argument. The instruction 6 also includes a temporary identifier HO-TLLI, which is assigned to the mobile station by the Serving GPRS Support Node SGSN. The instruction 6 does not contain any information for reconfiguration of higher layers. In the base station system the instruction 6 is supplemented by parameters of the reserved radio resources, which generates an instruction 7 which is transmitted from the base station system BSS to the mobile station MS.

The mobile station announces itself in a request for communication process 8 with the temporary handover identification HO-TLLI in the second cell and is registered by the base station system BSS. The handover procedure is then ended. The mobile station MS transmits to the base station system BSS a message 9 which signals the end of the handover procedure. This message is called HO-Complete for example. Furthermore the mobile station MS initiates a data transfer 11 to the base station system BSS and transmits to the mobile station MS a data packet in the uplink direction to the base station system and to the Serving GPRS Support Node SGSN. The message 9 HO-Complete can be sent and the data transfer 11 of the data packet undertaken simultaneously or consecutively. In this case it makes no difference whether the message 9 is sent first or the data 11 is transferred first. The message 9 produces an action 10 in the base station system BSS which causes data stored in the base station system BSS for the downlink direction to be sent from the base station system BSS to the mobile station MS. In addition the base station system BSS releases radio resources in the first cell.

The receipt in the Serving GPRS Support Node SGSN of the data packet which was sent in the data transfer 11 brings about an action 12 which causes the duplication of the data packets to be ended. Furthermore the radio resources are released for the first cell. A data transfer 13 in the downlink direction is then undertaken exclusively from the Serving GPRS Support Node SGSN via the second transceiver unit to the mobile station MS.

After the exchange of data 11, 13 between the mobile station MS and the base station system BSS and the Serving GPRS Support Node SGSN has been resumed again, a procedure 14 for a routing area update is executed in the known way.

In the example described it has been assumed that the first cell and the second cell are served by base stations belonging to one and the same base station system BSS. If this is not the case, the preparation 3 of the handover procedure and the ending 9 of the handover procedure are each undertaken in conjunction with the Serving GPRS Support Node SGSN.

If is also assumed that the data packets are duplicated in the downlink direction in the Serving GPRS Support Node SGSN. A possible alternative is also to duplicate the packets in the base station system BSS. The duplication ensures that data packets to be sent in the downlink direction are kept available during the handover procedure both in the first transceiver unit and also in the second transceiver unit.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in Superguide v. DIRECTV, 69 USPQ2d 1865 (Fed. Cir. 2004).

The invention claimed is:

1. A method for carrying out a handover in a radio communication system, comprising:
   establishing a packet switched connection from a mobile station to a first cell via a first transceiver unit, the mobile station being assigned to a first routing area in the first cell;
   assigning a routing area update identifier to the connection if the mobile station moves into a second cell which is served by a second transceiver unit, and into a second routing area;
   performing a handover of the packet switched connection from the first cell to the second cell;
   during at least a portion of the handover, pausing an exchange of data via the packet switched connection;
   after the handover, resuming the exchange of data via the packet switched connection; and
   updating the routing area from the first routing area to the second routing area, after the exchange of data is resumed.

2. The method in accordance with claim 1, wherein before the handover from the first cell to the second cell, radio resources for the, packet switched connection are reserved in the second cell.

3. The method in accordance with claim 1, wherein as soon as the connection is assigned the routing area update identifier, data packets destined for the mobile station are duplicated and provided to both the first transceiver unit and the second transceiver unit.

4. The method in accordance with claim 1, wherein after the handover, at least for a transitional period, data compression and data encryption are performed in the same manner as before the handover.

5. The method in accordance with claim 1, wherein the mobile station is assigned a first identifier for the first routing area,
   the mobile station is assigned the routing area update identifier for the handover to the second cell, which routing area update identifier is used until the routing area is updated, and
   when the routing area is updated, the mobile station is assigned a second identifier for the second routing area.

6. The method in accordance with claim 5, wherein the routing area update identifier is a temporary identifier selected from a set of identifiers reserved for switching routing areas.

7. The method in accordance with claim 5, wherein the routing area update identifier is a temporary identifier comprising the first identifier and a supplementary identifier.

8. The method in accordance with claim 5, wherein the routing area update identifier is a temporary identifier assigned by an administrator.

9. The method in accordance with claim 5, wherein
the routing area update identifier is a temporary identifier assigned by an allocated Serving GPRS Support Node SGSN of the radio communication system.

10. The method in accordance with claim 1, wherein
to complete the handover, a data packet is sent from the mobile station to the second transceiver unit, and
after the data packet is received at the second transceiver unit, the second transceiver unit starts sending data packets to the mobile station.

11. The method in accordance with claim 2, wherein
as soon as the connection is assigned the routing area update identifier, data packets destined for the mobile station are duplicated and provided to both the first transceiver unit and the second transceiver unit.

12. The method in accordance with claim 11, wherein
after the handover, at least for a transitional period, data compression and data encryption are performed in the same manner as before the handover.

13. The method in accordance with claim 12, wherein
the mobile station is assigned a first identifier for the first routing area,
the mobile station is assigned the routing area update identifier for the handover to the second cell, which routing area update identifier is used until the routing area is updated, and
when the routing area is updated, the mobile station is assigned a second identifier for the second routing area.

14. The method in accordance with claim 13, wherein
the routing area update identifier is a temporary identifier selected from a set of identifiers reserved for switching routing areas.

15. The method in accordance with claim 13, wherein
the routing area update identifier is a temporary identifier comprising the first identifier and a supplementary identifier.

16. The method in accordance with claim 13, wherein
the routing area update identifier is a temporary identifier assigned by an administrator.

17. The method in accordance with claim 13, wherein
the routing area update identifier is a temporary identifier assigned by an allocated Serving GPRS Support Node SGSN of the radio communication system.

18. The method in accordance with claim 13, wherein
to complete the handover, a data packet is sent from the mobile station to the second transceiver unit, and
after the data packet is received at the second transceiver unit, the second transceiver unit starts sending data packets to the mobile station.

19. A radio communication system comprising:
a first routing area;
a first cell to establish a packet switched connection with a mobile station, the first cell being located in the first routing area;
a second routing area;
a second cell located in the second routing area;
a first identifier device, associated with the first routing area, to assign a temporary identifier to the connection if the mobile station moves from the first cell to the second cell;
a second identifier device, associated with the second routing area, to assign a second identifier to the connection after a handover of the connection from the first cell to the second cell, after data exchange is paused during the handover, and after data exchange is resumed when the handover is completed.

20. A method for carrying out a handover in a radio communication system, comprising:
establishing a packet switched connection from a mobile station to a first cell, the first cell being within a first routing area;
assigning a routing area update identifier to the connection if the mobile station moves into a second cell in a second routing area;
performing a handover of the packet switched connection from the first cell to the second cell;
during at least a portion of the handover, pausing an exchange of data via the packet switched connection;
after the handover, resuming the exchange of data via the packet switched connection; and
updating the routing area from the first routing area to the second routing area, after the exchange of data is resumed.

* * * * *

UNITED STATES PATENT AND TRADEMARK OFFICE
CERTIFICATE OF CORRECTION

| | |
|---|---|
| PATENT NO. | : 7,257,100 B2 |
| APPLICATION NO. | : 10/528193 |
| DATED | : August 14, 2007 |
| INVENTOR(S) | : Bernd Kurzmann et al. |

Page 1 of 1

It is certified that error appears in the above-identified patent and that said Letters Patent is hereby corrected as shown below:

Column 2, Line 67, after "avoided" insert --.--.

Column 6, Line 36, after "the" delete ",".

Signed and Sealed this

First Day of April, 2008

JON W. DUDAS
*Director of the United States Patent and Trademark Office*